Sept. 26, 1967  C. B. DUNN ET AL  3,343,544
CRYOGENIC SURGICAL INSTRUMENT
Filed Dec. 21, 1965
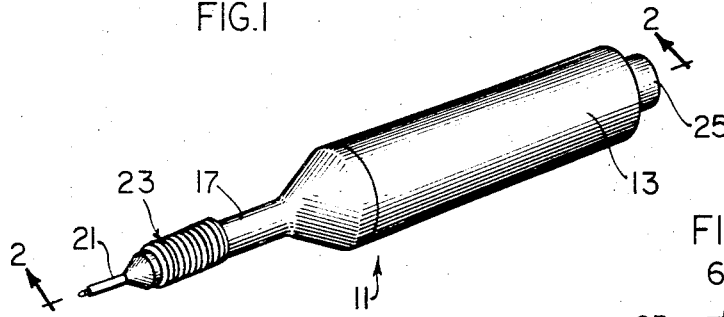
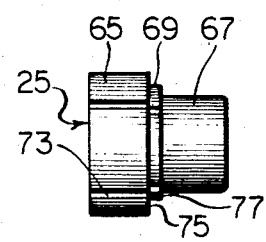
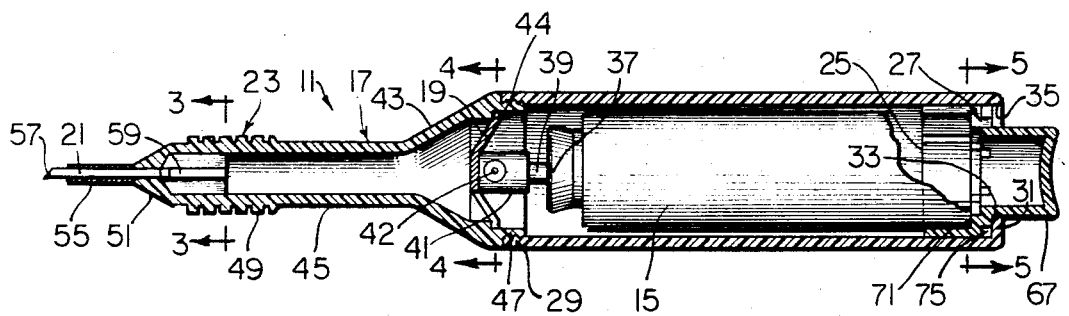
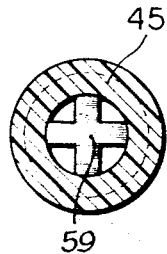
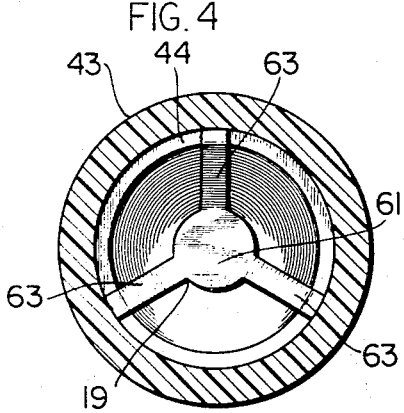
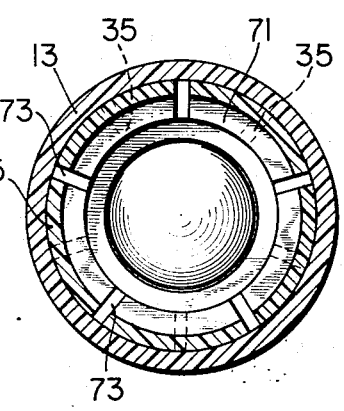
INVENTOR.
CRAWFORD B. DUNN
GUY G. CRAWFORD
ELDON G. WESTON
BY Anderson, Luedeka, Fitch, Even, & Tabin ATTORNEYS United States Patent Office 3,343,544
Patented Sept. 26, 1967

3,343,544
CRYOGENIC SURGICAL INSTRUMENT
Crawford B. Dunn, Dallas, and Guy Glenworth Crawford and Eldon G. Weston, Fort Worth, Tex., assignors to Alcon Laboratories, Inc., Fort Worth, Tex., a corporation of Texas
Filed Dec. 21, 1965, Ser. No. 515,377
4 Claims. (Cl. 128—303.1)

ABSTRACT OF THE DISCLOSURE

A compact lightweight self-contained cryogenic surgical instrument which includes a hollow receptacle for receiving a valved container of refrigerant, a hollow expansion chamber connected to the forward end of the receptacle and having a slender elongated probe supported in a wall thereof, a valved actuator stop for engaging and opening the valve of the refrigerant container, a pusher for manually pressing the refrigerant container forwardly within the hollow receptacle, and a vent formed in the pusher and the rear end of the receptacle for exhausting spent gases from the instrument.

---

This invention relates generally to a surgical instrument, and more particularly, it relates to a compact, balanced self-contained cryogenic surgical instrument.

In recent years, many advances have been made in cryogenic surgery. Cryogenic surgery utilizes localized extreme cold to accomplish a surgical result. Two well-known uses of cryogenic surgery are for the creation of lesions, such as in the nerve centers of the brain in the treatment of Parkinson's disease, and for the removal of cataracts, moles or other abnormalities from the human body. Cryogenic surgery is performed with a surgical instrument which has a probe or tip of relatively small size which is cooled to a desired low temperature and then applied to the area to be treated. The probe may be cooled by immersion in a liquid refrigerant, such as liquid nitrogen or a mixture of alcohol and Dry Ice, or by providing the probe with suitable passageways for circulating a refrigerant through the probe.

In cryogenic surgery for the removal of cataracts, the eye is surgically prepared in accordance with known procedures to expose the lens. The cold probe of the cryogenic surgical instrument is then touched to the surface of the moist lens causing a localized area of the lens to become frozen to the probe. When the probe has been cooled to a desired temperature, the adhesion of the lens to the probe is sufficiently strong so that, when the probe is removed, the lens is extracted from the eye.

Cryogenic surgical instruments for the removal of the lens from the eye in cataract surgery must be well-balanced, lightweight and compact in order that they may be conveniently utilized by the surgeon. Also, the cryogenic instrument is preferably self-contained, that is, it contains a supply of refrigerant within the instrument itself which is under the control of the surgeon, as opposed to being connected to an external supply of refrigerant by means of a hose.

Various surgical instruments have been devised for cryogenic surgery. One form of cryogenic surgical instrument which has achieved success, particularly in the field of cataract surgery, is disclosed in Patent No. 3,259,131. The surgical instrument disclosed therein includes a self-contained container of a refrigerant under pressure which is dispensed into an expansion chamber adjacent a heat-conductive probe for cooling the probe to the desired temperature.

It would be advantageous to provide an improved cryogenic surgical instrument of the type described in Patent No. 3,259,131 which has improved balance and which is constructed so that the refrigerant may be conveniently dispensed into the expansion chamber in order to obtain rapid and controlled cooling of the probe. Also, it would be desirable to provide a self-contained, low cost cryogenic surgical instrument which may be packaged in sterile form and which may be disposed of after being used, thereby avoiding the necessity of re-sterilization.

The main objects of the present invention are to provide an improved surgical instrument; to provide a compact, lightweight, self-contained, well-balanced cryogenic surgical instrument; to provide a compact, lightweight, self-contained, well-balanced cryogenic surgical instrument for cataract surgery which has improved operability; and to provide a compact, lightweight, self-contained, well-balanced cryogenic surgical instrument which may be rapidly cooled to a desired temperature.

These and other objects of the invention may be more readily understood from the following detailed description, and from the accompanying drawing in which:

FIGURE 1 is a perspective view of a specific embodiment of the improved cryogenic surgical instrument of the present invention;

FIGURE 2 is a sectional view, partly in elevation, taken along line 2—2 of FIGURE 1;

FIGURE 3 is a sectional view taken along line 3—3 of FIGURE 2;

FIGURE 4 is a sectional view taken along line 4—4 of FIGURE 2;

FIGURE 5 is a sectional view taken along line 5—5 of FIGURE 2; and

FIGURE 6 is an elevational view of a specific form of pusher utilized in the illustrated embodiment.

Very generally, and having reference to the accompanying drawing, the present invention is directed to an improved cryogenic surgical instrument 11. The cryogenic instrument 1 includes a hollow receptacle 13 adapted to receive and contain a valved container 15, of a refrigerant under pressure. A hollow expansion chamber 17 is connected to the forward end of the receptacle 13 in fluid communication therewith, and a valve actuator stop 19 is supported within the interior of the hollow expansion chamber 17 which is adapted to engage and open the valve of the container 15 when the container 15 is pressed forwardly. A slender elongated probe 21 is rigidly supported intermediate its ends in the forward wall of the expansion chamber 17 with the inner end of the probe 21 extending into the expansion chamber 17. The forward portion of the expansion chamber 17 adjacent the probe 21 is provided with a finger grip 23 for holding of the instrument 11. A manually movable pusher 25 is carried by the receptacle 13 for pressing the container 15 forwardly against the valve actuator stop 19 to dispense the refrigerant from the container 15 into the expansion chamber 17. A vent means, indicated generally by numeral 27, is also provided in the receptacle 13 to exhaust spent refrigerant gases from the instrument 11.

Referring to the drawing in more detail, FIGURE 1 is a perspective view of the instrument 11 and illustrates the general configuration of a preferred embodiment of the present invention. The instrument 11 is generally cylindrical in shape and the various parts, as described herein, are generally co-axially disposed. As used herein, the term "forward" means the direction toward the probe 21, and the term "rearward" means the opposite direction.

The hollow receptacle 13 is preferably formed in the shape of a cylinder and is open at its forward end. The interior surface of the forward edge of the receptacle 13 is provided with screw threads 29 (FIGURE 2) for connecting the receptacle 13 to the hollow expansion chamber 17. It is also contemplated that the abutting rims of the receptacle and expansion chamber may be secured together by means of a snaplock or in any other desired manner.

As illustrated in FIGURE 2, the receptacle 13 is provided at its rearward end with an inwardly extending annular flange 31 which defines a circular central opening 33 in the rear end wall of the receptacle 13 of lesser diameter than the diameter of the receptacle itself. The annular flange 31 is provided with a plurality of radial slots 35 extending therethrough which co-operate with the pusher 25 in a manner described hereinafter to provide the vent means 27 for exhausting spent refrigerant gases from the instrument 11.

The hollow receptacle 13 has a length and a cross-sectional dimension such that it may receive the valved container 15 of refrigerant under pressure. The container 15 has a cylindrical shape to fit within the receptacle 13 and is provided with a neck 37 within which is housed a dispensing valve (not shown) which may be of conventional design. A hollow valve stem 39 extends through the end wall of the neck 37, and is provided with a nozzle 41 having an orifice 42 in the side wall thereof for dispensing of the refrigerant from the container 15.

The particular construction of the container 15 and its associated valve is in accordance with known practices in the aerosol packaging industry and does not form a part of the present invention. In accordance with such known construction, the valve within the container 15 is actuated by pressing the container forwardly so that the nozzle 41 engages the valve actuator stop 19 thereby depressing the nozzle 41 and the valve stem 39 relative to the container 15, and opening the valve within the container 15 to allow the pressurized contents of the container to be dispensed through the hollow valve stem 39, nozzle 41 and the orifice 42.

A suitable refrigerant under pressure is provided within the container 15. Preferably, the refrigerant is a liquified gas. For cataract surgery, it has been found to be desirable to cool the probe to a temperature of between about minus 5° C. and about minus 50° C. in order to obtain good adhesion of the lens to the probe and without freezing too great an area of the lens and the surrounding tissues of the eye. A desirable refrigerant for cooling the probe to the desired temperature is Propellant 12 (dichlorodifluoromethane) which exhibits a boiling temperature of minus 29.8° C. Alternate refrigerants which may be used are Propellant 22 (chlorodifluoromethane) which exhibits a boiling temperature of minus 40.8° C., and Propellant 502 (a mixture of chlorodifluoromethane and chloropentofluoroethane) with a boiling temperature of minus 45.6° C.

As shown in FIGURES 1 and 2, the expansion chamber 17 includes a frusto-conical neck portion 43 and a co-axial elongated cylindrical portion 45. The neck 43 is formed at the rearward end of the expansion chamber 17 and the base of the neck 43 has a cross-sectional dimension the same as that of the receptacle 13. The rearward edge of the outer surface of the neck 43 is provided with suitable screw threads 47 for engagement with the screw threads 29 to connect the expansion chamber 17 to the receptacle 13. The neck 43 is provided with an internal, annular, rearwardly facing shoulder 44 for supporting the valve actuator stop 19 as described hereinafter.

The cylindrical portion 45 has a reduced cross-section as compared to the cross-section of the receptacle 13, and preferably the cylindrical portion 45 has a cross-sectional dimension such that the instrument may be held in the hand by grasping the cylindrical portion 45 in the manner in which a pencil is held.

In order to aid in holding the instrument 11 in the described manner, the outer surface of the expansion chamber 17 is provided adjacent its forward end with the finger grip 23. As seen in FIGURES 1 and 2, the finger grip 23 preferably includes a plurality of spaced apart annular ribs 49, which provide a roughened area on the otherwise smooth surface of the instrument, and also insulate the fingers from the cold refrigerant that is dispensed into the expansion chamber 17 during use of the instrument.

It has been determined that in order to provide balance and ease of handling of the instrument, the length of the cylindrical portion 45 of the expansion chamber 17 should be substantially in excess of its cross-sectional dimension. For best results and ease of handling the preferred embodiment of the instrument shown in the accompanying drawing, it has been found that the length of the cylindrical portion 45 of the expansion chamber 17 should be at least four times the diameter of the cylindrical portion 45.

The slender elongated heat-conductive probe 21 is rigidly supported intermediate its ends in the forward end wall 51 of the expansion chamber 17. One end of the probe 21 extends beyond the forward end of the expansion chamber 17, and the other end of the probe 21 extends through the wall 51 into the interior of the expansion chamber 17 to provide a heat sink. The wall 51 is preferably thicker than the sidewalls of the expansion chamber 17 in order to provide added support to the probe 21.

The greater portion of the exposed part of the probe between its tip and the forward end wall 51 is encased in an insulating sleeve 55 formed of plastic or other suitable material. The exposed tip 57 of the probe may be provided with a flat face as illustrated in FIGURE 2, or may be in the form of a needle or other suitable shape depending upon the desired use of the instrument.

The inner end of the probe 21 which forms a heat sink is preferably, not necessarily, provided with a block 59 of heat conductive material of large surface area in order to provide an increased rate of heat transfer. In a preferred embodiment of the invention and as illustrated in FIGURE 3, the block 59 is in the form of a spider and engages the inner wall of the cylindrical portion 45 of the expansion chamber 17. The heat conductive block 59 serves to increase the heat conduction of the probe, and aids in maintaining the probe rigidly supported in the wall 51 of the expansion chamber 17.

As best seen in FIGURES 2 and 4, the valve actuator stop 19 is preferably formed in the shape of a spider or star which spans the interior of the conical neck 43 of the expansion chamber 17. The spider includes a centrally located hub 61 and a plurality of arms 63 which engage the shoulder 44 to retain the valve actuator stop 19 in position. The valve actuator stop 19 is positioned within the expansion chamber 17 so that the hub 61 is closely adjacent the nozzle 41 for engagement therewith to open the valve when the container 15 is pushed forwardly by the pusher 25.

The manually movable pusher 25 is carried by the receptacle 13 in engagement with the container 15 so that the container 15 may be pressed forwardly upon forward movement of the pusher 25. In the preferred embodiment of the invention illustrated in the drawing, the pusher 25 is disposed within the interior of the receptacle 13 at the rearward end thereof. As shown in FIGURES 2 and 6, the pusher 25 includes a cup-shaped socket 65 for receiving the rear end of the container 15. The base of this socket is formed to provide a rearwardly projecting knob 67 and an intermediate annular offset 69.

The cup-shaped socket 65 has a cross-sectional dimension such that it fits snugly within the receptacle 13 in slidable engagement within the interior side wall thereof and it is provided with an internal annular shoulder 71 for engagement with the bottom end wall of the container 15. A plurality of axial slots 73 extend through the offset 69, annular shoulder 71 and the cylindrical sidewall of the socket 65 to provide the vent means for exhausting spent refrigerant gases from the instrument.

The annular offset 69 has a smaller cross-sectional dimension than the socket 65, thereby forming with the socket an annular groove 75 which provides a channel or passageway for the spent gases. Also, the pusher knob 67 has a smaller diameter than the offset 69 so that the rear face of the offset forms an annular stop 77 for engagement with the annular flange 31 of the receptacle 13 to limit the rearward movement of the pusher when the knob 67 projects rearwardly through the central opening 33 of the receptacle.

The provision of the annular passageway 75 is such that it is not necessary for the slots 73 in the socket 65 to be in alignment with the slots 35 in the flange 31 in order to exhaust spent refrigerant gases from the instrument. As seen in FIGURE 2, the spent refrigerant gases may pass through the slots 73, along the annular passageway 75 whence they may pass out of the instrument through the slots 35.

In operation, and in order to prepare the instrument for use, the instrument is grasped in the hand and held with expansion chamber 17 and the probe 21 pointing downwardly. The knob 67 is then depressed in order to push the container 15 forwardly within the receptacle 13. The forward movement of the container 15, relative to the receptacle 13, causes the nozzle 41 to engage the hub 61 of the valve actuator stop 19. Since the valve actuator stop 19 is rigidly supported within the expansion chamber 17 by engagement of the arms 63 with the shoulder 44, further depression of the pusher 25 causes the valve stem 39 to be axially depressed with respect to the container 15 thereby causing the dispensing valve contained within the neck 37 of the container 15 to be opened, whereupon the refrigerant under pressure is dispensed from the container 15 through the hollow valve stem 39, nozzle 41, and the orifice 42 into the expansion chamber 17. The knob 15 is held down until sufficient refrigerant has been dispensed into the expansion chamber 17 to fill the expansion chamber. The knob may then be released, whereupon the valve mechanism within the container 15 causes the container to be moved axially with respect to the valve stem 39 thereby closing the valve.

The container is held in a position with the probe 21 pointing downwardly until such time as the probe reaches the desired temperature. Generally, this temperature is obtained in a matter of a few seconds, and the appearance of frost upon the surface of the tip 57 of the probe 21 and the plastic sheath 55 is an indication that the probe is cooled to the desired temperature. The probe is then utilized for whatever surgical procedure is desired.

If the probe is to be used for more than a single surgical procedure or over an extended period of time, the expansion chamber 17 may be disengaged from the receptacle 13 to replace the spent container 15 with a fresh container of refrigerant.

It can be seen that a self-contained, well-balanced, and compact cryogenic surgical instrument has been disclosed which is convenient to use and which provides desired operating features. The instrument may be readily held in the same manner as a pencil is held, and the arrangement of the various parts of the instrument provides balance and ease of manipulation by the surgeon. Also, the instrument is constructed so that it may be disassembled and assembled in a short period of time in order that a fresh container of refrigerant may be readily inserted into the instrument.

It is understood that the invention has been described with reference to a single embodiment thereof, and various alternatives are contemplated as being within the skill of the art.

Various of the features of the invention are set forth in the following claims.

What is claimed is:

1. A lightweight compact self-contained cryogenic surgical instrument comprising,
   (a) a hollow receptacle for receiving a valved container of refrigerant under pressure,
   (b) an expansion chamber communicating with the forward end of said receptacle,
   (c) a valve actuator stop within said expansion chamber adapted to engage and open the valve of the container when the container is pressed forwardly,
   (d) an elongated solid heat-conductive probe rigidly supported intermediate its ends in a wall of said expansion chamber with the inner end of said probe extending into said expansion chamber, said probe having a relatively small cross-sectional dimension in comparison to its length,
   (e) a manually movable pusher on said receptacle adapted to press the container forwardly against said stop for opening the valve to dispense the refrigerant into said expansion chamber,
   (f) and vent means formed in the pusher and in the rear end of the receptacle for exhausting spent gases from said instrument.

2. A cryogenic surgical instrument in accordance with claim 1 wherein the manually operable pusher projects through an opening in the rear end of the receptacle for operative engagement with the rear end of the refrigerant container.

3. A cryogenic surgical instrument in accordance with claim 1 wherein the rear end of the receptacle is formed to provide an annular flange defining a central opening in which the pusher is axially movable for contact with the rear end of the refrigerant container, the vent means for exhausting spent gases being formed in the pusher and in the annular flange.

4. A cryogenic surgical instrument in accordance with claim 3 wherein the pusher comprises a cup-shaped socket adapted to receive the rear end of the refrigerant container, an integral knob on the base of said socket projecting through the central opening at the rear end of the receptacle, and an annular shoulder on the base of said cup-shaped socket adapted to abut the rear extremity of the refrigerant container, said vent means being formed in said cup-shaped socket and in the annular flange at the rear end of said receptacle.

References Cited
UNITED STATES PATENTS

| | | | |
|---|---|---|---|
| 2,645,097 | 7/1953 | Posch | 128—303 |
| 2,914,222 | 11/1959 | Meshberg | 222—162 |
| 3,220,414 | 11/1965 | Johnston | 128—400 |

RICHARD A. GAUDET, *Primary Examiner.*

G. E. McNEILL, *Assistant Examiner.*